United States Patent
Mo et al.

(10) Patent No.: US 12,269,536 B2
(45) Date of Patent: Apr. 8, 2025

(54) UPPER BODY INNER PANEL ASSEMBLY OF VEHICLE

(71) Applicants: Hyundai Motor Company, Seoul (KR); Kia Corporation, Seoul (KR)

(72) Inventors: Jin Young Mo, Hwaseong-si (KR); Ho Yeon Kim, Daegu (KR); Tae Gyu Park, Hwaseong-si (KR); Hyun Cheol Yun, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 301 days.

(21) Appl. No.: 18/053,891

(22) Filed: Nov. 9, 2022

(65) Prior Publication Data

US 2023/0286592 A1    Sep. 14, 2023

(30) Foreign Application Priority Data

Mar. 10, 2022   (KR) .................. 10-2022-0030258

(51) Int. Cl.
  *B62D 25/08*   (2006.01)
  *B62D 25/00*   (2006.01)
  *B62D 25/06*   (2006.01)
  *B62D 27/02*   (2006.01)
  *B62D 33/04*   (2006.01)

(52) U.S. Cl.
  CPC ............. *B62D 25/06* (2013.01); *B62D 25/00* (2013.01); *B62D 25/08* (2013.01); *B62D 27/023* (2013.01); *B62D 33/04* (2013.01); *B62D 33/044* (2013.01)

(58) Field of Classification Search
  CPC ...... B62D 24/00; B62D 33/04; B62D 33/046; B62D 33/044; B62D 23/00; B62D 23/005; B62D 27/02; B62D 27/06; B62D 27/065; B62D 25/00; B62D 25/02; B62D 25/08
  USPC ......... 296/193.01, 3, 8, 9, 23.01–4, 26.01, 2
  See application file for complete search history.

(56) References Cited

U.S. PATENT DOCUMENTS

| | | | | |
|---|---|---|---|---|
| 709,894 | A | * | 9/1902 | Farrell .................. B61D 49/00 105/1.1 |
| 4,469,369 | A | * | 9/1984 | Belik .................. B62D 31/025 296/193.04 |
| 5,388,529 | A | * | 2/1995 | Tieberghien ......... B61D 17/045 105/418 |
| 2002/0033299 | A1 | * | 3/2002 | Thomas .................. B60G 3/18 280/788 |
| 2020/0331245 | A1 | | 10/2020 | Seo et al. |

FOREIGN PATENT DOCUMENTS

KR    20200122605 A    10/2020

* cited by examiner

*Primary Examiner* — Dennis H Pedder
(74) *Attorney, Agent, or Firm* — Slater Matsil, LLP (57) ABSTRACT

An embodiment upper body inner panel assembly of a vehicle includes a front inner panel and a rear inner panel disposed at a front and a rear of an upper body of the vehicle, respectively, wherein the upper body includes a plurality of pipes, wherein each of the front inner panel and the rear inner panel comprises a left part and a right part coupled to each other, and wherein the left part and the right part of the front inner panel and the left part and the right part of the rear inner panel are disposed in intersecting directions.

20 Claims, 10 Drawing Sheets

FIG. 10

UPPER BODY INNER PANEL ASSEMBLY OF VEHICLE

CROSS-REFERENCE TO RELATED APPLICATIONS

This application claims the benefit of Korean Patent Application No. 10-2022-0030258, filed on Mar. 10, 2022, which application is hereby incorporated herein by reference.

TECHNICAL FIELD

The present invention relates to a panel assembly.

BACKGROUND

A general vehicle body is produced by machining and welding pails through pressing using a press die, whereby large-scale facilities, such as a press plant, a vehicle body welding plant, and a painting shop, are required, and design freedom is low.

In particular, many changes in design of a conventional vehicle body are required at the time of small quantity batch production, whereby the number of press dies is greatly increased, and therefore manufacturing cost is increased.

In order to respond to recent rapidly changed market environments and customer needs, it is necessary to simplify the production of a vehicle and to minimize the development period thereof.

Consequently, there is a need for a vehicle body structure having improved assembling efficiency in a smart factory environment while being capable of responding to various designs.

In addition, it is necessary to achieve cost reduction and manufacture simplification through part sharing.

The matters disclosed in this section are merely for enhancement of understanding of the general background of embodiments of the invention and should not be taken as an acknowledgment or any form of suggestion that the matters form the related art already known to a person skilled in the art.

SUMMARY

The present invention relates to a panel assembly. Particular embodiments relate to an inner panel assembly coupled to an upper body of a vehicle body in which an outer panel is coupled outside the inner panel assembly.

Embodiments of the present invention may solve problems in the art, and an embodiment of the present invention provides an inner panel assembly coupled to an upper body of a vehicle body constituted by a plurality of pipes, wherein an outer panel is coupled outside the inner panel assembly.

In accordance with an embodiment of the present invention, the above and other features can be accomplished by the provision of an upper body inner panel assembly of a vehicle fastened to an upper body of a vehicle body constituted by a plurality of pipes, wherein an outer panel is coupled outside the upper body inner panel assembly, the upper body inner panel assembly including a front inner panel and a rear inner panel disposed at a front and a rear of the upper body, respectively, each of the front inner panel and the rear inner panel including two parts divided left and right and coupled to each other, wherein the first part and the second part of the front inner panel and the first part and the second part of the rear inner panel are disposed in intersecting directions.

The front inner panel and the rear inner panel may be formed using identical parts configured such that ends of the first part and the second part overlap each other.

The upper body inner panel assembly may further include a pair of longitudinal inner panels extending in a longitudinal direction of the vehicle, the longitudinal inner panels being configured to connect opposite sides of the front inner panel and the rear inner panel to each other.

The upper body inner panel assembly may further include a middle inner panel disposed between the front inner panel and the rear inner panel, the middle inner panel being formed in an arch shape in which a central part thereof projects upwards, and opposite ends of the middle inner panel being coupled to the respective longitudinal inner panels.

The parts of each of the front inner panel and the rear inner panel, the longitudinal inner panels, or the middle inner panel may be fastened in a manner in which the panels that are coupled to each other partially overlap each other.

Each of the front inner panel and the rear inner panel may include a first contact portion depressed toward the vehicle body constituted by the plurality of pipes and coupled to the vehicle body in contact therewith.

Each of the longitudinal inner panels may be provided with a second projecting portion formed on the part thereof that overlaps the front inner panel and the rear inner panel so as to project toward the front inner panel and the rear inner panel, each of the front inner panel and the rear inner panel may be provided with a second depressed portion, into which the second projecting portion is inserted, and the longitudinal inner panels may be coupled to the front inner panel and the rear inner panel as the result of the second projecting portion being inserted into the second depressed portion.

Each of the longitudinal inner panels may be provided in the part thereof that overlaps the middle inner panel with a third depressed portion, into which an end of the middle inner panel is inserted, and the middle inner panel may be coupled to the longitudinal inner panel as the result of an end of the middle inner panel being inserted into the third depressed portion.

Each of the longitudinal inner panels may include a second contact portion depressed toward the vehicle body so as to be coupled to the vehicle body.

Each of the front inner panel and the rear inner panel may include a first fastening portion projecting outwards so as to be coupled to the outer panel of the vehicle.

Each of the longitudinal inner panels may include a second fastening portion projecting outwards so as to be coupled to the outer panel of the vehicle.

Each of the front inner panel and the rear inner panel may be formed such that the first part and the second part are coupled to each other while overlapping each other, and at the position at which the first part and the second part face each other while overlapping each other, the first part may be provided with a first assembly portion configured to perform coupling by fitting, and the second part may be provided with a second assembly portion configured to be coupled to the first assembly portion by fitting, whereby the first part and the second part may be assembled with each other.

The middle inner panel may include a third fastening portion projecting outwards so as to be coupled to the outer panel of the vehicle.

BRIEF DESCRIPTION OF THE DRAWINGS

The above and other objects, features and other advantages of embodiments of the present invention will be more clearly understood from the following detailed description taken in conjunction with the accompanying drawings, in which.

DETAILED DESCRIPTION OF ILLUSTRATIVE EMBODIMENTS

Specific structural or functional descriptions of the embodiments of the present invention disclosed in this specification or this disclosure are given only for illustrating embodiments of the present invention. Embodiments of the present invention may be realized in various forms, and should not be interpreted to be limited to the embodiments of the present invention disclosed in this specification or this disclosure.

Since the embodiments of the present invention may be variously modified and may have various forms, specific embodiments will be shown in the drawings and will be described in detail in this specification or this disclosure. However, the embodiments according to the concept of the present invention are not limited to such specific embodiments, and it should be understood that the present invention includes all alterations, equivalents, and substitutes that fall within the idea and technical scope of the present invention.

It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

The terms used in this specification are provided only to explain specific embodiments, but are not intended to restrict the present invention. A singular representation may include a plural representation unless it represents a definitely different meaning from the context. It will be further understood that the terms "comprises", "has" and the like, when used in this specification, specify the presence of stated features, numbers, steps, operations, elements, components, or combinations thereof, but do not preclude the presence or addition of one or more other features, numbers, steps, operations, elements, components, or combinations thereof.

Unless otherwise defined, all terms, including technical and scientific terms, used in this specification have the same meanings as those commonly understood by a person having ordinary skill in the art to which the present invention pertains. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Reference will now be made in detail to the preferred embodiments of the present invention, examples of which are illustrated in the accompanying drawings. Wherever possible, the same reference numbers will be used throughout the drawings to refer to the same or like parts.

A relatively long manufacturing process and a relatively high manufacturing cost are required to provide a suspension, an exterior material, an interior material, a steering device, and a safety device to a conventional vehicle, in which a passenger rides, in consideration of driving comfort, safety specifications, aesthetics, and driving performance for the passenger. In addition, purpose-specific vehicles must be individually manufactured, and it is impossible to manufacture customized vehicles for all purposes.

A vehicle to which technology according to embodiments of the present invention is applied is a purpose built vehicle (PBV), specifically a business vehicle having various commercial purposes, such as logistics, food trucks, delivery, and service provision. In an embodiment shown, there is provided a vehicle that transports only cargo in a state of being loaded therein without passenger boarding, that is driven through an autonomous driving system, and that is used for unmanned delivery/logistics/transportation of cargo or food as a representative case.

The structure of the vehicle according to embodiments of the present invention may be simplified, and therefore design and manufacture of the vehicle may be simplified. Parts of the vehicle may be modularized so as to be commonly used, whereby cost may be reduced and supply of parts is easy. In addition, the modularized parts of the vehicle may be coupled to each other through an environmentally friendly smart factory production method based only on mechanical coupling using a bolt (not shown) or a rivet R, which does not require a press process, a vehicle body welding process, and a painting process, whereby the vehicle may be completed.

In embodiments of the present invention, the vehicle body may be constituted by a plurality of pipes in order to reduce manufacturing cost. Pipes can be manufactured through extrusion or roll forming, whereby manufacturing cost is low. When pipes are coupled to each other or when the pipes are coupled to other panels, however, it is necessary to increase coupling strength. In embodiments of the present invention, therefore, a coupling member 20 configured to close an open end of a vehicle body pipe is provided such that the end of the vehicle body pipe can be strongly coupled to another pipe or a panel, whereby deformation of the open end of the vehicle body pipe is inhibited by the coupling member 20, and a coupling surface 21 having formed therein a coupling hole 21*a* for coupling to another construction is provided.

Figure 9:
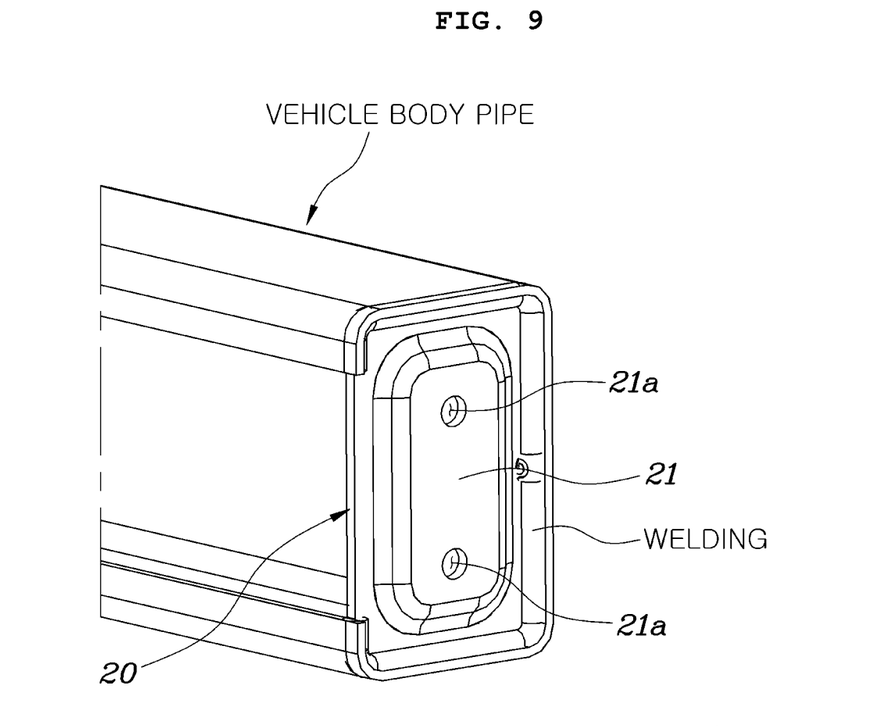
FIG. 9 is a perspective view showing that a coupling member is coupled to an end of a vehicle body pipe according to an embodiment of the present invention.

FIG. 9 is a perspective view showing that a coupling member 20 is coupled to an end of a vehicle body pipe according to an embodiment of the present invention. As shown in FIG. 9, the coupling member 20 is welded to the end of the pipe in a state of being spaced apart inwards therefrom in a longitudinal direction of the pipe, and welding beads are disposed in a space formed as the result of the coupling member 20 being spaced apart inwards from the end of the pipe, whereby lapping of the welding beads is omitted, and therefore integration with the coupling member 20 is simplified. In the structure in which the pipe according to embodiments of the present invention and the coupling member 20 are integrated, the vehicle body may be easily assembled through only mechanical coupling, such as bolting or riveting, in an environmentally friendly smart factory. Since welding is unnecessary, the process is environmentally friendly. In addition, when an accident occurs or maintenance is necessary, it is possible to easily replace some members of the vehicle body. Furthermore, various kinds of vehicles may be easily assembled and produced.

The vehicle to which embodiments of the present invention is applied may be divided into a business area located above, in which cargo is loaded, and a drive area located below, which takes charge of driving of the vehicle. The business area may be variously changed depending on customer demand, and the drive area may be variously changed depending on driving conditions of the vehicle.

The vehicle according to the embodiments shown is basically designed to have a structure in which a door is open from only one side to open a space in which cargo can be loaded, and the business area may be designed in various shapes depending on customer demand.

An upper body of the vehicle according to embodiments of the present invention constitutes a vehicle body located in the business area of the vehicle for the unmanned delivery system.

The upper body and a lower body may be assembled with each other through a plurality of pipe-shaped members by bolting (not shown), whereby manufacture, repair, and rebuilding thereof may be easy. A lower part of the upper body may constitute a floor, and a driving motor, wheels, a suspension, and a battery may be loaded in the lower body. In addition, an additional battery may be loaded or a cargo space may be defined in the middle of the lower body. The upper body and the lower body may be individually assembled and fastened to each other in a vertical direction to constitute a body of a completed vehicle. Consequently, the upper body and the lower body may be assembled in various combinations.

A vehicle to which embodiments of the present invention is applied is configured such that a vehicle body is constituted by coupling of a plurality of pipes. Embodiments of the present invention relate to an inner panel of the vehicle body that is coupled to an upper body, which is a business area, wherein an outer panel forming the exterior of the vehicle may be assembled outside the inner panel.

Figure 1:
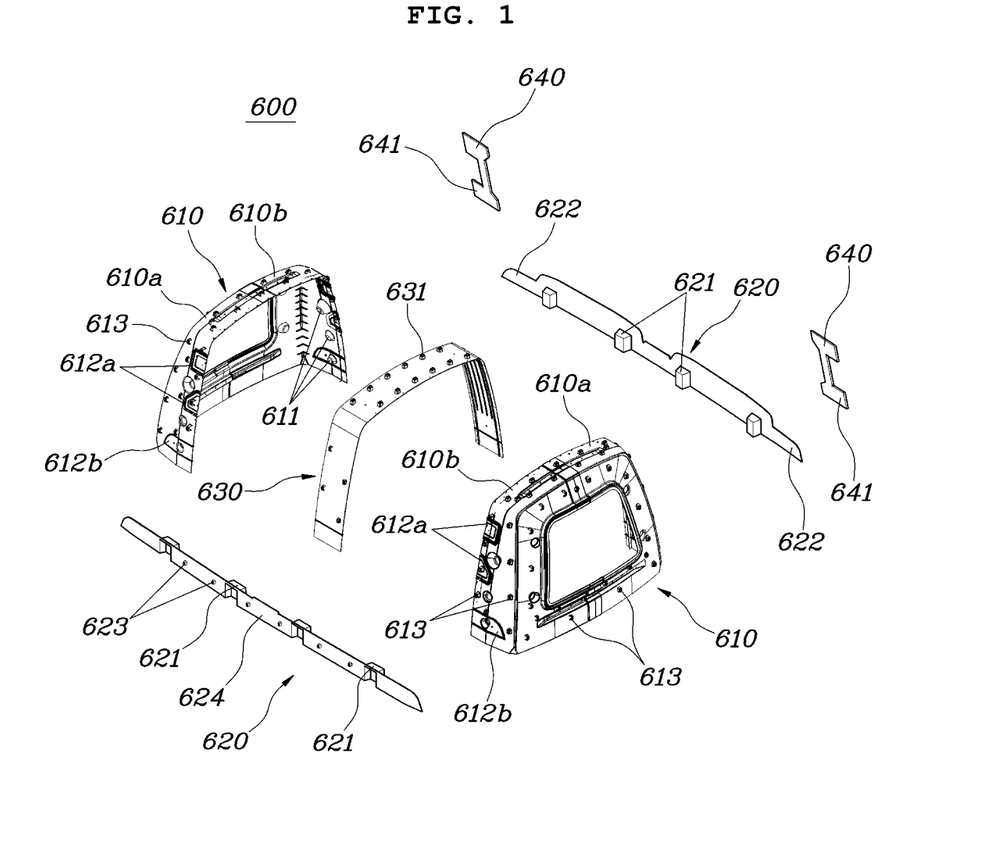
FIG. 1 is an exploded perspective view of an upper body inner panel assembly of a vehicle according to embodiments of the present invention.
Figure 2:
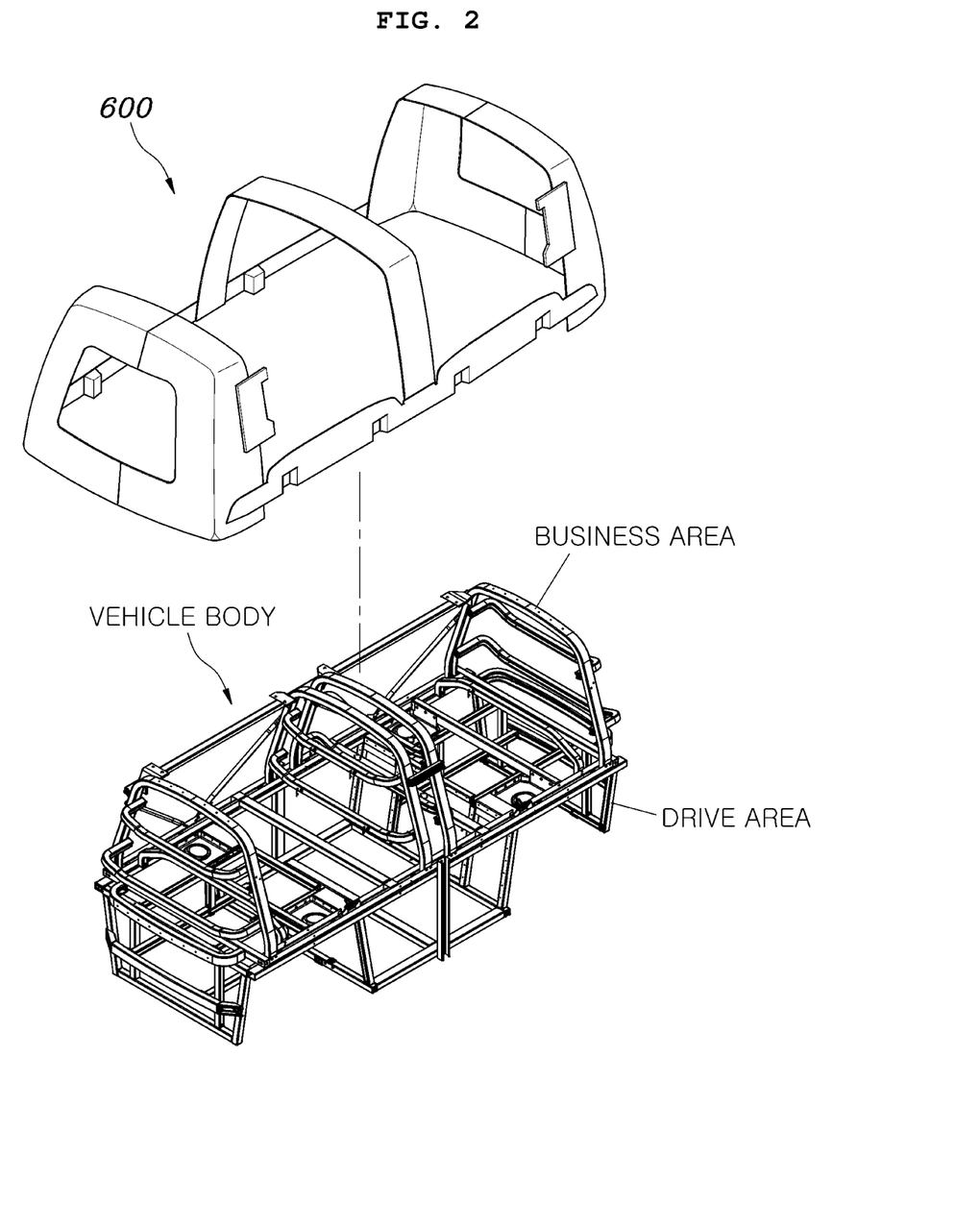
FIG. 2 is a perspective view showing coupling between the upper body inner panel assembly of the vehicle according to embodiments of the present invention and a vehicle body.
Figure 3:
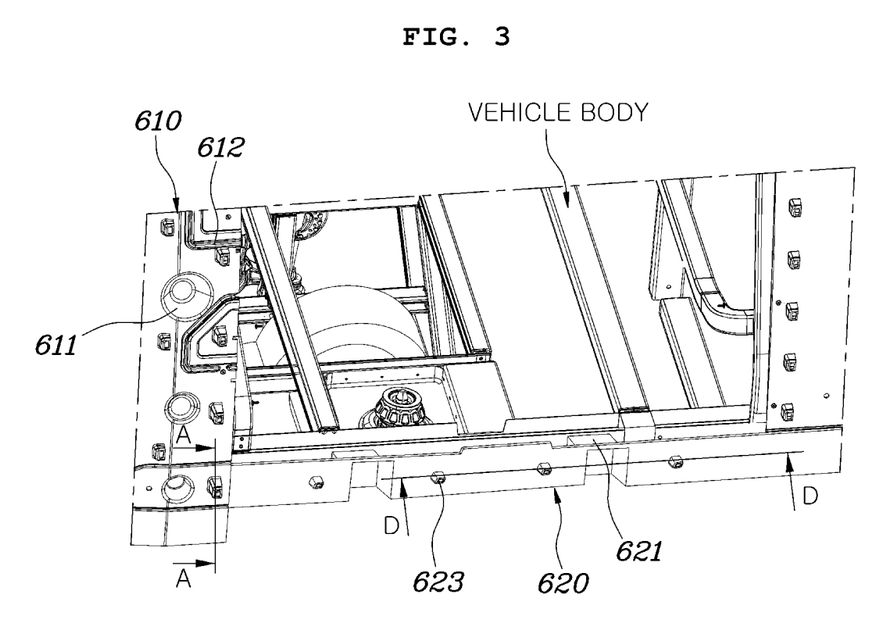
FIG. 3 is an enlarged side perspective view of the upper body inner panel assembly of the vehicle according to embodiments of the present invention.
Figure 4:
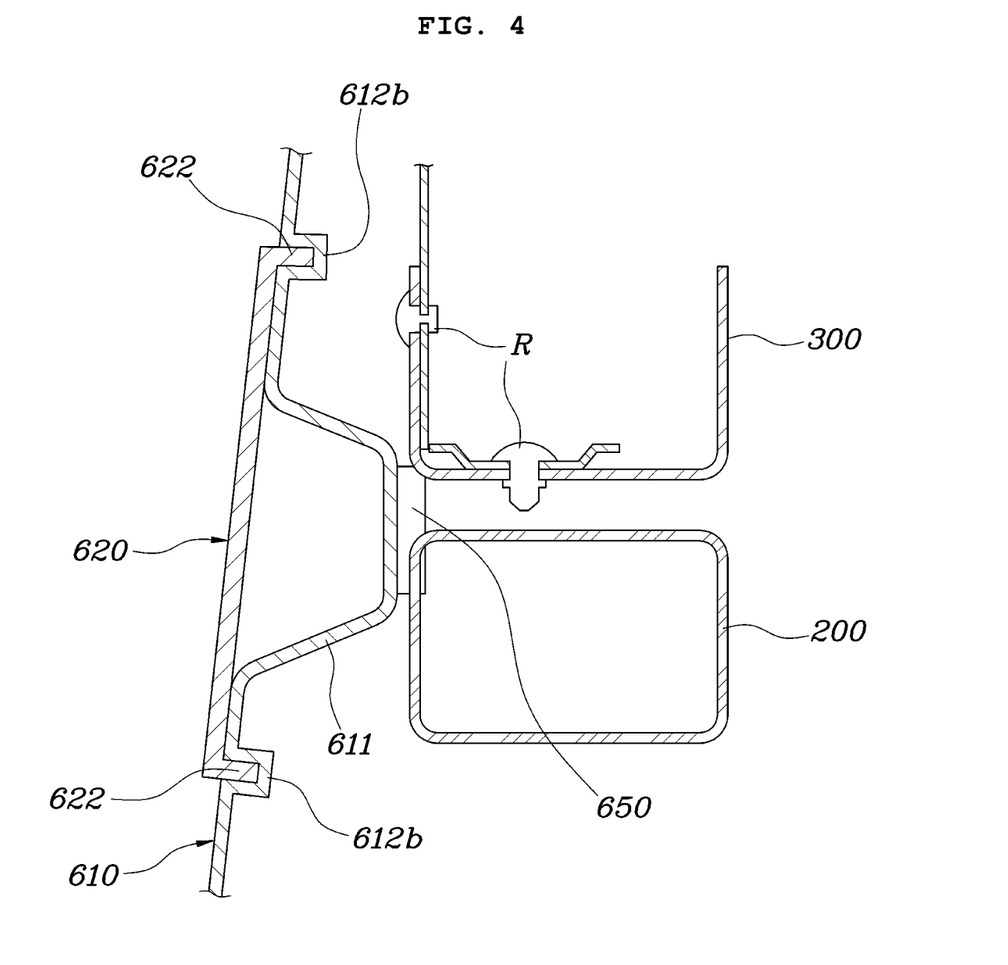
FIG. 4 is a sectional view taken along line A-A of FIG. 3.
Figure 5:
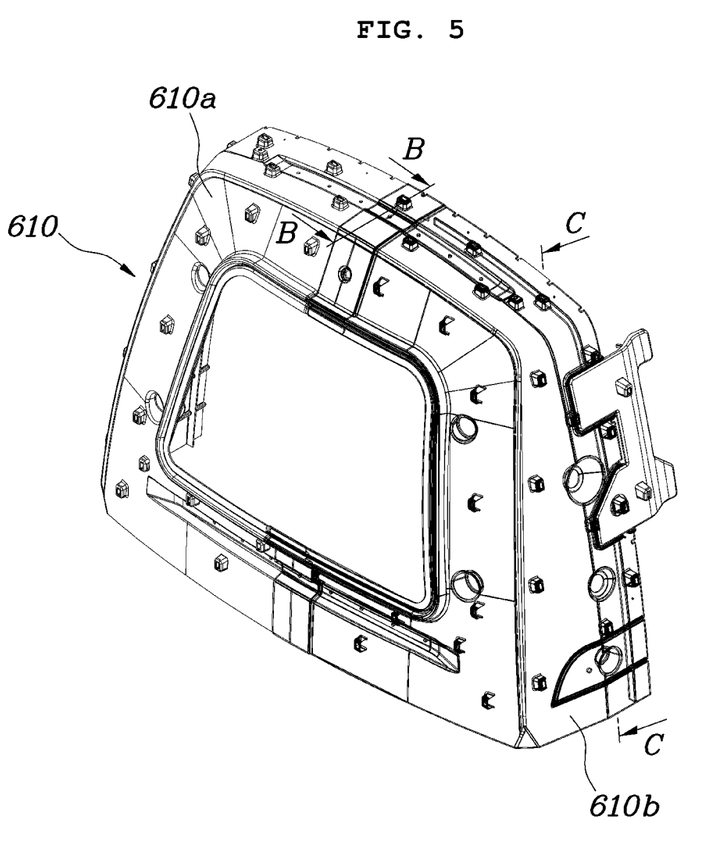
FIG. 5 is a perspective view of a front part of the upper body inner panel assembly of the vehicle according to embodiments of the present invention.
Figure 6:
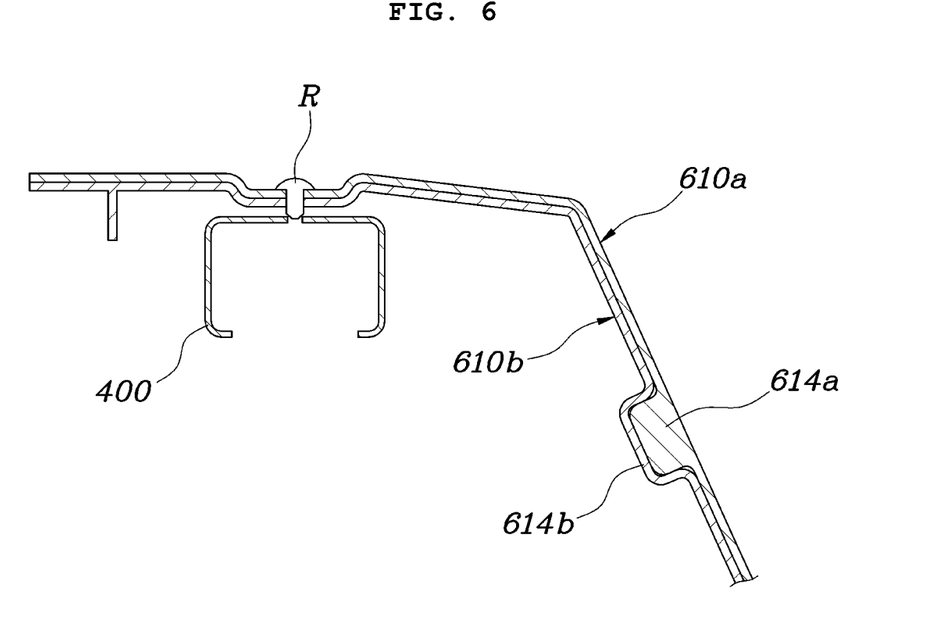
FIG. 6 is a sectional view taken along line B-B of FIG. 5.
Figure 7:
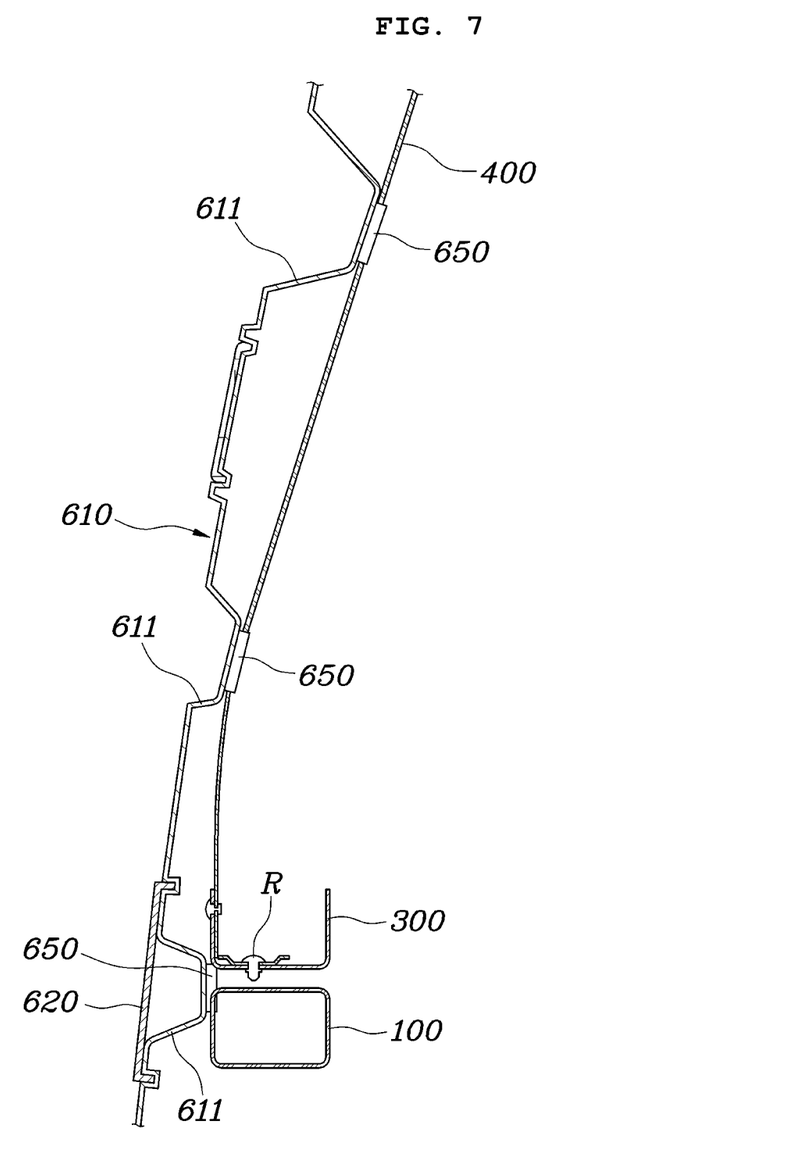
FIG. 7 is a sectional view taken along line C-C of FIG. 5.

FIG. 1 is an exploded perspective view of an upper body inner panel assembly 600 of a vehicle according to embodiments of the present invention, FIG. 2 is a perspective view showing coupling between the upper body inner panel assembly 600 of the vehicle according to embodiments of the present invention and a vehicle body, FIG. 3 is an enlarged side perspective view of the upper body inner panel assembly 600 of the vehicle according to embodiments of the present invention, FIG. 4 is a sectional view taken along line A-A of FIG. 3, FIG. 5 is a perspective view of a front part of the upper body inner panel assembly 600 of the vehicle according to embodiments of the present invention, FIG. 6 is a sectional view taken along line B-B of FIG. 5, and FIG. 7 is a sectional view taken along line C-C of FIG. 5.

A preferred embodiment of an upper body inner panel assembly 600 of a vehicle according to embodiments of the present invention will be described with reference to FIGS. 1 to 7.

As shown in FIG. 2, the upper body inner panel assembly boo of the vehicle according to embodiments of the present invention may include an upper body inner panel fastened to an upper body of a vehicle body constituted by a plurality of pipes, wherein an outer panel is coupled outside the upper body inner panel.

Specifically, the upper body inner panel assembly 600 may include a front inner panel 610 and a rear inner panel 610 disposed at a front and a rear of the upper body, respectively, each of the front inner panel and the rear inner panel including two parts divided left and right and coupled to each other, a pair of longitudinal inner panels 620 extending in a longitudinal direction of the vehicle to connect opposite sides of lower parts of the front inner panel 610 and the rear inner panel 610 to each other, and a middle inner panel 630 disposed between the front inner panel 610 and the rear inner panel 610, the middle inner panel 630 being formed in an arch shape in which a central part thereof projects upwards, opposite ends of the middle inner panel 630 being coupled to the respective longitudinal inner panels 620.

As shown in FIGS. 1 and 2, the vehicle body may project upwards and may be bent from a front and a rear thereof, whereby opposite pillars and a roof may be formed. The front inner panel 610 and the rear inner panel 610 may be located at the front and the rear of the vehicle body, respectively, and may be formed so as to wrap the opposite pillars, the roof, and a front part of the vehicle body disposed at the front and the rear of the vehicle body. Two panels may be coupled to each other in order to form the inner panel 200.

In addition, the longitudinal inner panels 620 may connect opposite sides of the front inner panel 610 and the rear inner panel 610 to each other and may be coupled to the upper body of the vehicle. The middle inner panel 630 may be located between the front inner panel 610 and the rear inner panel 610, may project in a height direction of the vehicle, and may be bent so as to wrap the vehicle body having the opposite pillars and the roof.

The parts of each of the front inner panel 610 and the rear inner panel 610, the longitudinal inner panels 620, or the middle inner panel 630 may be fastened in a manner in which the panels that are coupled to each other partially overlap each other.

Ends of two parts of each of the front inner panel 610 and the rear inner panel 610 are coupled to each other so as to overlap each other, ends of the longitudinal inner panels 620 are coupled to the front inner panel 610 and the rear inner panel 610 so as to overlap each other, and opposite ends of the middle inner panel 630 are coupled to the middle sides of the longitudinal inner panels 620 so as to overlap each other. Consequently, the panels are coupled to each other so as to overlap each other, whereby coupling force is increased. In addition, the overlapping parts are prevented from being separated from each other.

The front inner panel 610 and the rear inner panel 610 may be formed using the same parts configured such that ends of a first part 610*a* and a second part 610*b* overlap each other.

As shown in FIGS. 1 and 2, the front inner panel 610 and the rear inner panel 610 may be formed using the same parts, and may be disposed at and coupled to the front and rear of the vehicle body.

As a result, manufacturing cost may be reduced when the vehicle is manufactured, and mass productivity of vehicles may be improved.

The first part 610*a* and the second part 610*b* of the front inner panel 610 and the first part 610*a* and the second part 610*b* of the rear inner panel 610 are disposed in intersecting directions, the pair of longitudinal inner panels 620 connect the front inner panel 610 and the rear inner panel 610 to each other, and the middle inner panel 630 connects the pair of longitudinal inner panels 620 to each other between the front inner panel 610 and the rear inner panel 610, whereby an organic annular structure may be formed.

As shown in FIGS. 1 and 2, each of the front inner panel 610 and the rear inner panel 610 is formed in a shape in which two panels are coupled to each other, and the two panels of each of the front inner panel 610 and the rear inner panel 610 are disposed so as to correspond to each other in a diagonal direction. Ends of the longitudinal inner panels 620 are coupled outside the front inner panel 610 and the rear inner panel 610 in an overlapping state, and the middle inner panel 630 is coupled outside the longitudinal inner panels 620 in an overlapping state. Consequently, an organic annular structure that prevents separation between the front inner panel 610, the rear inner panel 610, the longitudinal inner panels 620, and the middle inner panel 630 may be provided.

It is possible to increase assembly rigidity of the inner panel assembly 600 without addition of a separate coupling member through such a coupling structure.

An inner bracket 640 coupled to the front inner panel 610 or the rear inner panel 610 so as to be coupled to an interior material of the vehicle may be further included.

The interior material may be coupled to the upper body of the vehicle so as to form a loading space in which cargo is loaded is formed, and the inner bracket 640 may be coupled to a side surface of the front inner panel 610 or the rear inner panel 610 such that the interior material is connected to the inner panel so as to be fixed to the vehicle body.

The inner bracket 640 may be disposed in plural depending on the kind or number of interior materials, and may be mounted to opposite ends of the front inner panel 610 or opposite ends of the rear inner panel 610.

A first projecting portion 641 projecting inwardly of the vehicle may be formed on the inner bracket 640, and a first depressed portion 612*a*, into which the first projecting portion 641 is inserted, may be formed in the front inner panel 610 or the rear inner panel 610. The inner bracket 640 may be coupled to the front inner panel 610 or the rear inner panel 610 by fitting as the result of the first projecting portion 641 being inserted into the first depressed portion 612*a*.

In an embodiment of the present invention, the first projecting portion 641 may project from an end of the inner bracket 640 toward an inside of the vehicle so as to be coupled to the front inner panel 610 or the rear inner panel 610, and the first depressed portion 612*a*, into which the first projecting portion 641 is inserted, may be provided in the front inner panel 610 or the rear inner panel 610.

As a result, the inner bracket 640 may be coupled to the front inner panel 610 or the rear inner panel 610 without a separate assembly structure, and then the inner bracket 640 may be fixed by bolting (not shown) or riveting R or may be fixed using an adhesive material. The inner bracket 640 may be fixed by simply inserting the first projecting portion 641 into the first depressed portion 612*a*.

As an embodiment of the shape of the first projecting portion 641, the first projecting portion 641 may be formed so as to project while extending along an outer end of the inner bracket 640, and the first depressed portion 612*a* may be formed in a shape corresponding to the first projecting portion 641.

The front inner panel 610 or the rear inner panel 610 may include a first contact portion 611 depressed toward the vehicle body constituted by the plurality of pipes and coupled to the vehicle body in contact therewith.

As shown in FIG. 7, the first contact portion 611, which is depressed toward the vehicle body constituted by the pipes so as to be coupled to the vehicle body such that an end of the first contact portion 611 contacts the vehicle body, may be formed at each of the front inner panel 610 and the rear inner panel 610.

The first contact portion 611 may be disposed so as to correspond to the position of the vehicle body constituted by the pipes such that each of the front inner panel 610 and the rear inner panel 610 is coupled to the vehicle body in contact therewith. A concrete coupling method will be described below.

As a result, a gap corresponding to the depressed depth of the first contact portion 611 may be formed between the vehicle body and each of the front inner panel 610 and the rear inner panel 610. When external impact is applied to the vehicle, the front inner panel 610 and the rear inner panel 610 may be damaged or crumpled due to the gap, whereby it is possible to absorb the impact, and therefore it is possible to protect cargo in the vehicle.

The end of the first contact portion 611 may contact the vehicle body constituted by the pipes, and may be coupled to the vehicle body using an adhesive pad 650, a bolt (not shown), or a rivet R.

The first contact portion 611 that contacts the vehicle body may be coupled and fixed to the vehicle body by bolting (not shown) or riveting R, and the parts that are not coupled to each other by bolting (not shown) or riveting R may be adhered to each other using the adhesive pad 650.

One surface of the adhesive pad 650 may be adhered to the end of the first contact portion 611, and the other surface of the adhesive pad 650 may contact the vehicle body. The front inner panel 610 and the rear inner panel 610 may be coupled to the vehicle body first, and may then be coupled to the first contact portion 611 by bolting (not shown) or riveting R. As a result, the adhesive pad 650 may be temporarily coupled first, and therefore bolting (not shown) or riveting R may be easily performed.

A second projecting portion 622 projecting toward the front inner panel 610 and the rear inner panel 610 may be formed on the part of each longitudinal inner panel 620 that overlaps the front inner panel 610 and the rear inner panel 610, and a second depressed portion 612*b*, into which the second projecting portion 622 is inserted, may be formed in each of the front inner panel 610 and the rear inner panel 610. The longitudinal inner panels 620 may be coupled to the front inner panel 610 and the rear inner panel 610 as the result of the second projecting portion 622 being inserted into the second depressed portion 612b.

As shown in FIGS. 3 and 4, the second projecting portion 622, which projects inwardly of the vehicle, may be formed on the part of each longitudinal inner panel 620 that overlaps the front inner panel 610 and the rear inner panel 610, and the second depressed portion 612b, into which the second projecting portion 622 is inserted, may be formed in each of the front inner panel 610 and the rear inner panel 610.

As a result, the longitudinal inner panels 620 may be coupled to the front inner panel 610 and the rear inner panel 610 without a separate assembly structure, and then the longitudinal inner panels 620 may be fixed by bolting (not shown) or riveting R or may be fixed using an adhesive material. The longitudinal inner panels 620 may be fixed by simply inserting the second projecting portion 622 into the second depressed portion 612b.

A third depressed portion 624, into which an end of the middle inner panel 630 is inserted, may be formed in the part of each longitudinal inner panel 620 that overlaps the middle inner panel 630, and the middle inner panel 630 may be coupled to the longitudinal inner panel 620 as the result of the end of the middle inner panel 630 being inserted into the third depressed portion 624.

The third depressed portion 624, which is depressed inwardly of the vehicle by the width of the middle inner panel 630 so as to be coupled to the middle inner panel 630 between opposite ends thereof, may be formed in the longitudinal inner panel 620, and the middle inner panel 630 may be inserted into the third depressed portion 624, whereby the middle inner panel 630 may be coupled to the longitudinal inner panel 620.

As a result, the longitudinal inner panel 620 and the middle inner panel 630 may be simply coupled to each other by fitting.

The longitudinal inner panel 620 may include a second contact portion 621 depressed toward the vehicle body so as to be coupled to the vehicle body.

Figure 8:
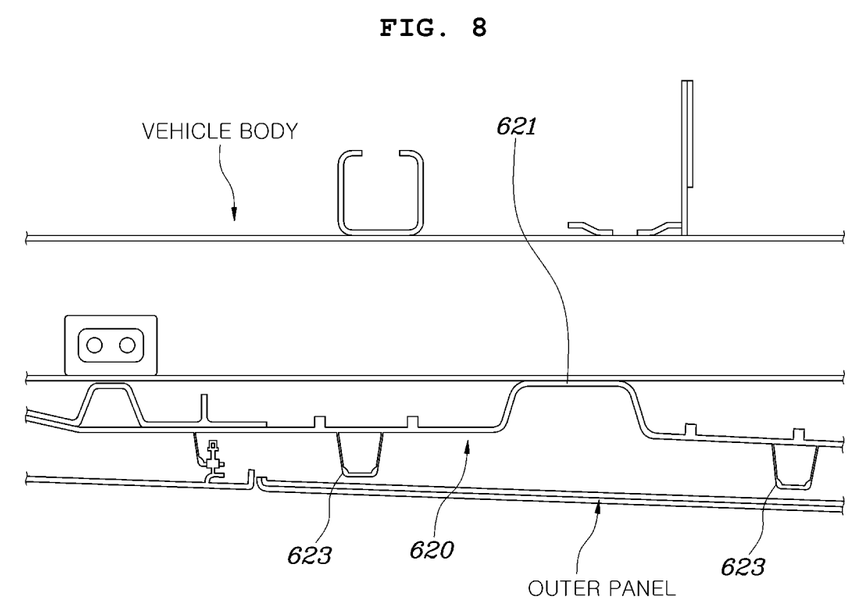
FIG. 8 is a sectional view taken along line D-D of FIG. 3.

FIG. 8 is a sectional view taken along line D-D of FIG. 3.

As shown in FIG. 8, the second contact portion 621, which is depressed toward the vehicle body constituted by the pipes so as to be coupled to the vehicle body, whereby an end of the second contact portion 621 contacts the vehicle body, may be formed at the longitudinal inner panel 620.

The second contact portion 621 may be disposed so as to correspond to the position of the vehicle body constituted by the pipes such that the longitudinal inner panel 620 is coupled to the vehicle body in contact therewith. A concrete coupling method will be described below.

As a result, a gap corresponding to the depressed depth of the second contact portion 621 may be formed between the vehicle body and the longitudinal inner panel 620. When an external impact is applied to the vehicle, the longitudinal inner panel 620 may be damaged or crumpled due to the gap, whereby it is possible to absorb the impact, and therefore it is possible to protect cargo in the vehicle.

The end of the second contact portion 621 may contact the vehicle body constituted by the pipes and may be coupled to the vehicle body using an adhesive pad 650, a bolt (not shown), or a rivet R.

The second contact portion 621 that contacts the vehicle body may be coupled and fixed to the vehicle body by bolting (not shown) or riveting R, and the parts that are not coupled to each other by bolting (not shown) or riveting R may be adhered to each other using the adhesive pad 650.

One surface of the adhesive pad 650 may be adhered to the end of the second contact portion 621, and the other surface of the adhesive pad 650 may contact the vehicle body. The longitudinal inner panel 620 may be coupled to the vehicle body first, and may then be coupled to the second contact portion 621 by bolting (not shown) or riveting R. As a result, the adhesive pad 650 may be temporarily coupled first, and therefore bolting (not shown) or riveting R may be easily performed.

Each of the front inner panel 610 and the rear inner panel 610 may include a first fastening portion 613 projecting outwards so as to be coupled to the outer panel of the vehicle, and each of the longitudinal inner panels 620 may include a second fastening portion 623 projecting outwards so as to be coupled to the outer panel of the vehicle.

The outer panel of the vehicle may be coupled outside the front inner panel 610, the rear inner panel 610, and the longitudinal inner panels 620. The first fastening portion 613 may project from each of the front inner panel 610 and the rear inner panel 610 and may be coupled to the outer panel of the vehicle by fitting, and the second fastening portion 623 may project from each of the longitudinal inner panels 620 and may be coupled to the outer panel of the vehicle by fitting.

Each of the front inner panel 610 and the rear inner panel 610 may be formed such that the first part 610a and the second part 610b are coupled to each other while overlapping each other. At the position at which the first part 610a and the second part 610b face each other while overlapping each other, the first part 610a may be provided with a first assembly portion 614a configured to perform coupling by fitting, and the second part 610b may be provided with a second assembly portion 614b configured to be coupled to the first assembly portion 614a by fitting, whereby the first part 610a and the second part 610b may be assembled with each other.

The middle inner panel 630 may include a third fastening portion 631 projecting outwards so as to be coupled to the outer panel of the vehicle.

The third fastening portion 631, which is identical to the first fastening portion 613 and the second fastening portion 623, may be provided at the middle inner panel 630, whereby the middle inner panel 630 may be coupled to the outer panel of the vehicle.

As shown in FIG. 6, the front inner panel 610 and the rear inner panel 610 may be formed using the same parts, and the first part 610a and the second part 610b are coupled to each other while overlapping each other. At the position at which the first part 610a and the second part 610b overlap each other, the first assembly portion 614a, which is depressed toward the vehicle body, may be formed at the first part 610a, and the second assembly portion 614b, which projects from the position corresponding to the first assembly portion 614a, may be formed at the second part 610b, whereby the first part 610a and the second part 610b may be coupled to each other by fitting.

At the position at which the first part 610a and the second part 610b overlap each other, the first part 610a and the second part 610b may be integrally coupled to the vehicle body by bolting (not shown).

As shown in FIG. 6, the first part 610a and the second part 610b overlap each other to form each of the front inner panel 610 and the rear inner panel 610. At the position at which the first part 610a and the second part 610b overlap each other, the first part 610a and the second part 610b may be coupled to the vehicle body by bolting (not shown), whereby it is possible to prevent separation between the first part 610a and the second part 610b.

In the upper body inner panel assembly 600 of the vehicle, the respective panels are coupled to each other by fitting, and are coupled to the vehicle body by bolting (not shown) or riveting R. In this assembly method, the respective panels are manufactured and are transported to a smart factory. In the smart factory, in which a manufacturing process, such as a pressing process and a painting process, is not performed, the vehicle is manufactured through simple coupling, such as fitting, bolting (not shown), or riveting R. The manufactured vehicle is transported to a customer. Consequently, the manufacturing process may be simplified, whereby manufacturing cost may be minimized.

Figure 10:
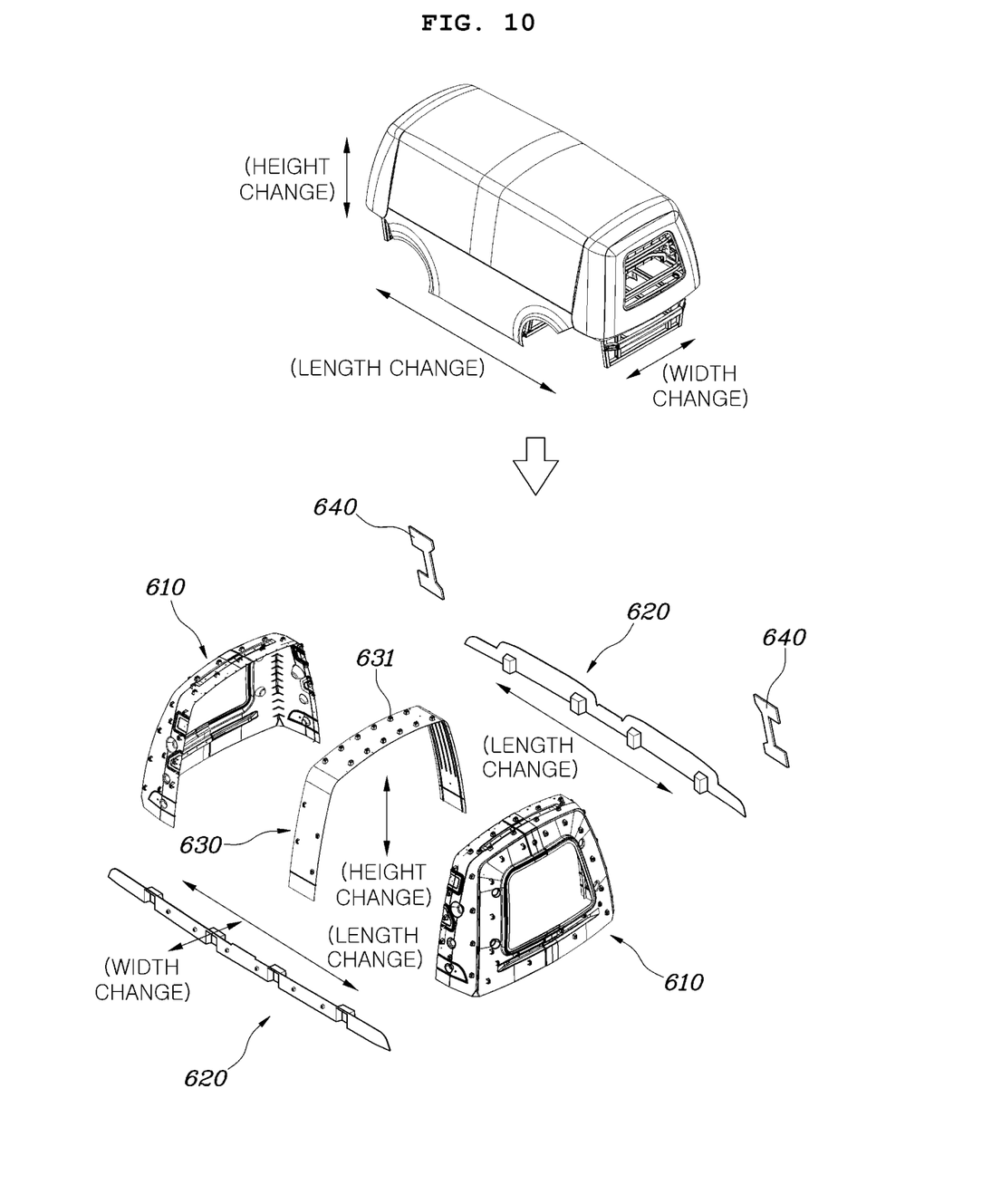
FIG. 10 is a view showing a change in size of the upper body inner panel of the vehicle according to embodiments of the present invention depending on a change in size of a vehicle.

FIG. 10 is a view showing a change in size of the upper body inner panel of the vehicle according to embodiments of the present invention depending on a change in size of the vehicle.

Referring further to FIG. 10, the length of the upper body inner panel of the vehicle according to embodiments of the present invention may be changed so as to correspond to a change in overall height, width, and length of the vehicle.

When the overall height of the vehicle is changed, the height of the middle inner panel 630 may be changed to change the overall height of the vehicle. When the overall width of the vehicle is changed, the length of the second contact portion 621 formed at the longitudinal inner panel 620 may be changed to correspond to a change in overall width of the vehicle. When the overall length of the vehicle is changed, the length of the longitudinal inner panel 620 may be changed to correspond to a change in overall length of the vehicle.

When vehicles satisfying various customer needs are manufactured, therefore, it is possible to conveniently manufacture vehicles by changing lengths of parts included in the inner panel assembly 600.

In addition, the inner panel assembly 600 according to embodiments of the present invention is designed such that a door of the vehicle is open at one side of the vehicle, the inner panel assembly 600 is formed in symmetry in the forward-rearward direction of the vehicle, and parts of the inner panel assembly 600 are coupled to each other by fitting, whereby coupling and separation between the parts are conveniently performed. As a result, coupling positions of the parts may be easily changed to the left side or the right side, and therefore, the positions of the parts of the inner panel assembly 600 may be changed in response to customer demand, whereby it is possible to easily manufacture the vehicle such that the door of the vehicle is open at the left side or the right side.

As is apparent from the above description, an upper body inner panel assembly of a vehicle according to embodiments of the present invention is configured such that panels are coupled to each other by fitting and are coupled to a vehicle body by bolting or riveting. In this assembly method, the respective panels are manufactured and are transported to a smart factory. In the smart factory, in which a manufacturing process, such as a pressing process and a painting process, is not performed, the vehicle is manufactured through simple coupling, such as fitting, bolting, or riveting. The manufactured vehicle is transported to a customer. Consequently, the manufacturing process may be simplified, whereby manufacturing cost may be minimized.

In addition, an organic annular structure that prevents separation between a front inner panel, a rear inner panel, longitudinal inner panels, and a middle inner panel is provided, and therefore it is possible to increase assembly rigidity of the inner panel assembly without addition of a separate coupling member through such a coupling structure.

In addition, since the front inner panel, the rear inner panel, the longitudinal inner panels, and the middle inner panel are coupled to each other through the organic annular structure, rigidity of the inner panels is improved, and therefore rigidity of an outer panel is improved. Furthermore, a load input to the inner panel assembly is distributed, whereby durability of the inner panel assembly is increased, and it is possible to absorb the tolerance of the vehicle body, which is formed in a truss structure, through organic coupling.

In addition, when the overall height, width, and length of the vehicle body are changed, shapes of the longitudinal inner panels and the middle inner panel are changed so as to correspond to various vehicle bodies, whereby it is possible to improve versatility.

Although specific embodiments of the present invention have been shown and described above, it will be apparent to those skilled in the art that various modifications and variations can be made in the present invention without departing from the technical idea of the present invention defined by the appended claims.

What is claimed is:

1. An upper body inner panel assembly of a vehicle, the upper body inner panel assembly comprising:
   a front inner panel and a rear inner panel disposed at a front and a rear of an upper body of the vehicle, respectively, wherein the upper body comprises a plurality of pipes, wherein each of the front inner panel and the rear inner panel comprises a left part and a right part coupled to each other, and wherein the left part and the right part of the front inner panel and the left part and the right part of the rear inner panel are disposed in intersecting directions.

2. The upper body inner panel assembly according to claim 1, wherein the front inner panel and the rear inner panel comprise identical parts configured such that ends of the left part and the right part overlap each other.

3. An upper body inner panel assembly of a vehicle, the upper body inner panel assembly comprising:
   a front inner panel and a rear inner panel disposed at a front and a rear of an upper body of the vehicle, respectively, wherein the upper body comprises a plurality of pipes, wherein each of the front inner panel and the rear inner panel comprises a left part and a right part coupled to each other, and wherein the left part and the right part of the front inner panel and the left part and the right part of the rear inner panel are disposed in intersecting directions; and
   a pair of longitudinal inner panels extending in a longitudinal direction of the vehicle, the pair of longitudinal inner panels being configured to connect opposite sides of the front inner panel and the rear inner panel to each other.

4. The upper body inner panel assembly according to claim 3, further comprising a middle inner panel disposed between the front inner panel and the rear inner panel, the middle inner panel having a shape in which a central part thereof projects upwards, and opposite ends of the middle inner panel being coupled to the respective longitudinal inner panel of the pair of longitudinal inner panels.

5. The upper body inner panel assembly according to claim 4, wherein the middle inner panel comprises a first fastening portion projecting outwards to be coupled to an outer panel of the vehicle.

6. The upper body inner panel assembly according to claim 4, wherein the left part and the right part of each of the front inner panel and the rear inner panel, the pair of longitudinal inner panels, or the middle inner panel are fastened in a manner in which the panels that are coupled to each other partially overlap each other.

7. The upper body inner panel assembly according to claim 4, wherein:
    each of the pair of longitudinal inner panels is provided with a first depressed portion in a part thereof that overlaps the middle inner panel;
    an end of the middle inner panel is inserted into the first depressed portion; and
    the middle inner panel is coupled to each of the pair of longitudinal inner panels by the end of the middle inner panel being inserted into the first depressed portion.

8. The upper body inner panel assembly according to claim 3, wherein:
    each of the pair of longitudinal inner panels comprises first projecting portions on parts thereof that overlap the front inner panel and the rear inner panel so as to project toward the front inner panel and the rear inner panel, respectively;
    each of the front inner panel and the rear inner panel comprises a second depressed portion, into which the first projecting portion is inserted; and
    the pair of longitudinal inner panels is coupled to the front inner panel and the rear inner panel by the first projecting portion being inserted into the second depressed portion.

9. The upper body inner panel assembly according to claim 3, wherein each of the pair of longitudinal inner panels comprises a first contact portion depressed toward a vehicle body of the vehicle to be coupled to the vehicle body.

10. The upper body inner panel assembly according to claim 3, wherein each of the pair of longitudinal inner panels comprises a second fastening portion projecting outwards to be coupled to an outer panel of the vehicle.

11. The upper body inner panel assembly according to claim 1, wherein each of the front inner panel and the rear inner panel comprises a second contact portion depressed toward a vehicle body and coupled to the vehicle body in contact therewith.

12. The upper body inner panel assembly according to claim 1, wherein each of the front inner panel and the rear inner panel comprises a third fastening portion projecting outwards to be coupled to an outer panel of the vehicle.

13. The upper body inner panel assembly according to claim 1, wherein:
    each of the front inner panel and the rear inner panel is provided such that the left part and the right part are coupled to each other while overlapping each other; and
    at a position at which the left part and the right part face each other while overlapping each other, the left part is provided with a first assembly portion configured to perform coupling by fitting, and the right part is provided with a second assembly portion configured to be coupled to the first assembly portion by fitting, whereby the left part and the right part are assembled with each other.

14. A vehicle comprising:
    a vehicle body comprising an upper body coupled to a lower body, wherein the upper body and the lower body each comprise a plurality of pipes;
    a front inner panel and a rear inner panel disposed at a front and a rear of the upper body of the vehicle, respectively, wherein each of the front inner panel and the rear inner panel comprises a left part and a right part coupled to each other, and wherein the left part and the right part of the front inner panel and the left part and the right part of the rear inner panel are disposed in intersecting directions;
    a pair of longitudinal inner panels extending in a longitudinal direction of the vehicle, the pair of longitudinal inner panels being configured to connect opposite sides of the front inner panel and the rear inner panel to each other;
    a middle inner panel disposed between the front inner panel and the rear inner panel, the middle inner panel having a shape in which a central part thereof projects upwards, and opposite ends of the middle inner panel being coupled to the respective longitudinal inner panel of the pair of longitudinal inner panels; and
    an outer panel coupled outside the front inner panel and the rear inner panel.

15. The vehicle according to claim 14, wherein the front inner panel and the rear inner panel comprise identical parts configured such that ends of the left part and the right part overlap each other.

16. The vehicle according to claim 14, wherein the middle inner panel comprises a first fastening portion projecting outwards and coupled to the outer panel of the vehicle.

17. The vehicle according to claim 14, wherein:
    each of the pair of longitudinal inner panels is provided with a first depressed portion in a part thereof that overlaps the middle inner panel;
    an end of the middle inner panel is inserted into the first depressed portion; and
    the middle inner panel is coupled to each of the pair of longitudinal inner panels by the end of the middle inner panel being inserted into the first depressed portion.

18. The vehicle according to claim 14, wherein:
    each of the pair of longitudinal inner panels comprises first projecting portions on parts thereof that overlap the front inner panel and the rear inner panel so as to project toward the front inner panel and the rear inner panel, respectively;
    each of the front inner panel and the rear inner panel comprises a second depressed portion, into which the first projecting portion is inserted; and
    the pair of longitudinal inner panels is coupled to the front inner panel and the rear inner panel by the first projecting portion being inserted into the second depressed portion.

19. The vehicle according to claim 14, wherein each of the pair of longitudinal inner panels comprises a first contact portion depressed toward the vehicle body and coupled to the vehicle body.

20. The vehicle according to claim 14, wherein:
    each of the pair of longitudinal inner panels comprises a second fastening portion projecting outwards and coupled to the outer panel of the vehicle; and
    each of the front inner panel and the rear inner panel comprises a third fastening portion projecting outwards to be coupled to the outer panel of the vehicle.

* * * * *